United States Patent [19]
Platt

[11] 3,819,999
[45] June 25, 1974

[54] CLOSED LOOP CONTROL SYSTEM INCLUDING AN INTEGRATOR AND LIMITING MEANS THEREFORE

[75] Inventor: Walter A. Platt, Fair Lawn, N.J.

[73] Assignee: The Bendix Corporation, Teterboro, N.J.

[22] Filed: June 18, 1973

[21] Appl. No.: 371,223

[52] U.S. Cl.................. 318/609, 318/621, 318/610
[51] Int. Cl............................................. G05b 11/36
[58] Field of Search .......... 318/584, 597, 609, 610, 318/611, 621

[56] References Cited
UNITED STATES PATENTS

| | | | |
|---|---|---|---|
| 2,688,264 | 2/1954 | Williams, Jr. | 318/610 |
| 3,510,737 | 5/1970 | Brown et al. | 318/621 |
| 3,523,193 | 8/1970 | Hutcheon | 318/609 |
| 3,566,241 | 2/1971 | Ross | 318/610 |
| 3,777,243 | 12/1973 | Taguchi et al. | 318/621 |

*Primary Examiner*—Gene Z. Rubinson
*Attorney, Agent, or Firm*—Anthony F. Cuoco; S. H. Hartz

[57] ABSTRACT

A closed loop control system includes a saturable control element responsive to integrator and proportional commands. Means are provided for inhibiting or limiting the integrator command while allowing the proportional command when the control element is saturated, for increasing system stability.

7 Claims, 5 Drawing Figures

CLOSED LOOP CONTROL SYSTEM INCLUDING AN INTEGRATOR AND LIMITING MEANS THEREFORE

BACKGROUND OF THE INVENTION

1. Field of the Invention

This invention relates generally to closed loop control systems and particularly to closed loop control systems having saturable control (servo) elements. More particularly, this invention relates to means for increasing the stability of systems of the type described.

2. Description of the Prior Art

In closed loop control systems where integrator and proportional commands command a saturable control element, system stability is adversely effected when the control element is saturated or at its limit. This is due to the fact that at this time the integrator command is still increasing and thus causes an overcorrection when the control element returns to its linear or proportional region of operation. In order to accommodate this condition, the integrator command must be limited or inhibited when the control element is saturated, while allowing the proportional command to command the system.

When the integrator command is provided through a separate operational amplifier arrangement, the required limiting is accomplished through appropriate switching at saturation of the control element. However, when integrator/proportion commands are provided through more complex lag circuit configurations, switching is prohibited because large output transients will result. The device of the present invention provides the required limiting without such undesired results.

SUMMARY OF THE INVENTION

This invention contemplates a closed loop control system including means for sensing a condition and for providing condition and condition rate signals. The condition and condition rate signals are summed and the summed signal is applied through an integrator/proportional command circuit for commanding a saturable control element to control the condition. The command circuit includes integrator means and a resistance-capacitance circuit connected to the integrator means through a normally closed switch. When the switch is closed the desired integrating characteristic is obtained, and when the switch is opened as a function of control element saturation, the circuit output holds its value just prior to switching and follows changes in the input (summed) signal in proportional fashion.

One object of this invention is to provide, for use with a control system including a saturable control element, an integrator/proportional command circuit for commanding the control element. Means are provided for inhibiting the integrator command when the control element is saturated without affecting the proportional command.

Another object of this invention is to provide means of the type described which inhibits the integrator command without providing a large output transient.

Another object of this invention is to provide means of the type described including a switching device for switching from integrator to proportional commands in response to control element saturation.

Another object of this invention is to provide a switching device of the type described which is normally closed to implement the integrator command and which is opened as a function of control element saturation, whereupon the output voltage of the command circuit holds its previous value and follows input changes in proportional fashion.

Another object of this invention is to provide a closed loop control system responsive to integrator/proportional commands and having increased stability over systems of the type now known in the art.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
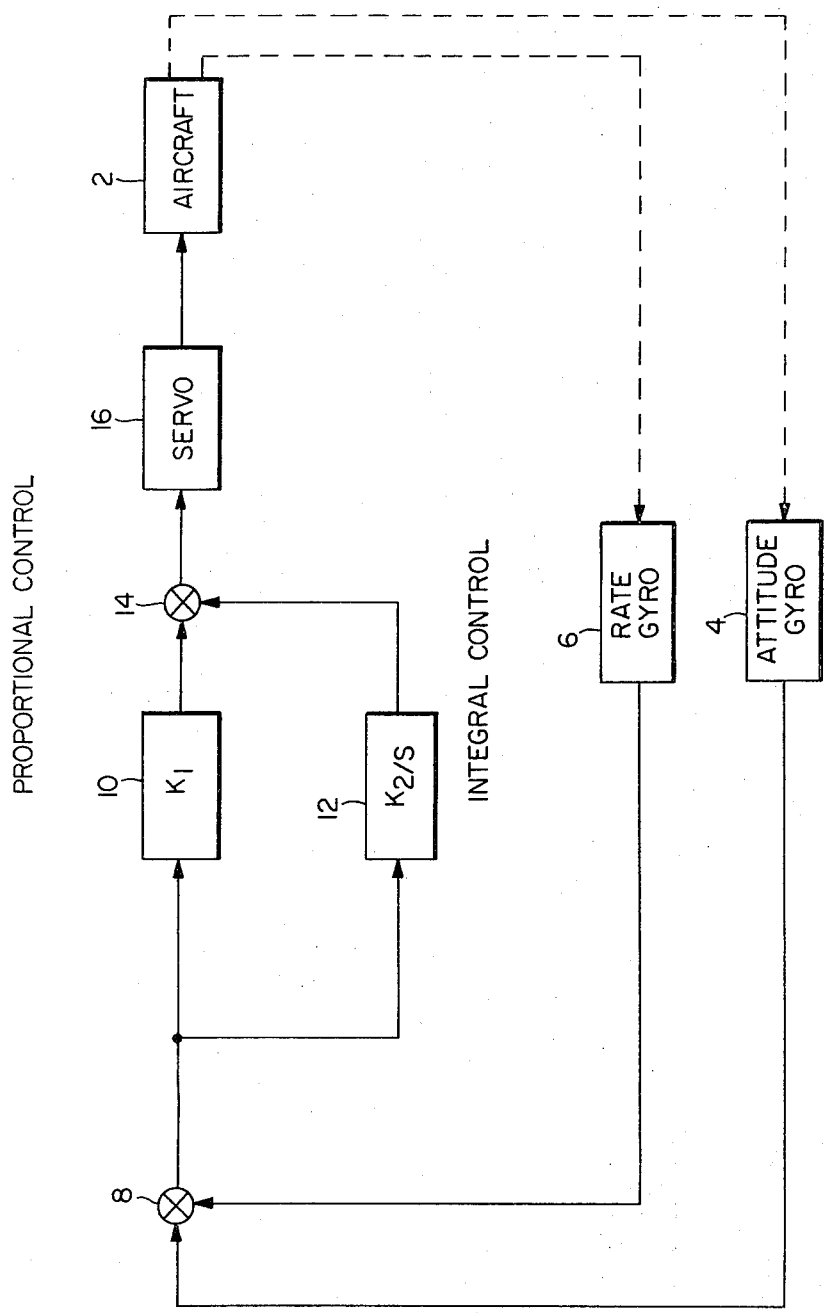
FIG. 1 is a block diagram of a control system with which the present invention may be used and showing generally integrator and proportional command circuits.

FIG. 1 shows a control system which is, for purpose of illustration, a pitch control system for controlling the pitch attitude of an aircraft 2, and which pitch control system will be described with reference to a pitch attitude hold mode.

Thus, a pitch attitude gyro 4 and a pitch rate gyro 6 suitably mounted to aircraft 2 provide pitch attitude and pitch rate signals, respectively. The signals are applied to a summing means 8 which sums the signals.

The summation signal from summing means 8 is applied to a proportional command circuit 10 having a gain $K_1$ and to an integrator command circuit 12 having a gain $K_{2/s}$. The outputs from circuits 10 and 12 are applied to a summing means 14 and summed thereby. The summation signal from summing means 14 is applied to a saturable (limited authority) control element such as a servo device 16 which controls suitable pitch control surfaces or elevators (not shown) on aircraft 2.

It will now be understood that in a closed loop control system such as described with reference to FIG. 1, system stability may be adversely affected. This is due to the fact that when servo 16 is at its limit or saturated, the output from integrator 12 will still be increasing thereby delaying the time when the servo system returns to its linear region of operation. A similar effect occurs when the integrator circuit is implemented by lag means having a time constant larger than the system time constant.

Thus, with further reference to FIG. 1, when aircraft 2 is in a pitch attitude hold mode and the aircraft is banked, pitch attitude decreases due to the loss of vertical lift and due to restraints on the gimbals of attitude gyro 4 (assuming the roll gimbal axis of the gyro has an initial nose-up attitude). This provides a negative error which implements a positive command to servo 16 and a positively increasing signal from integrator circuit 12. Since servo 16 is saturable or has limited authority, the nose down attitude takes time to be arrested and reversed during which the output of integrator 12 is building up or accumulating. The attitude and rate errors as sensed by gyros 4 and 6, respectively, reverse sign and integrator 12 must run down in order for servo 16 to return to its linear control region. During this time servo 16 has been against its positive stop (saturated) and the resultant positive control surface (elevator) deflection of aircraft 2 causes a large positive pitch attitude overshoot. It therefore is desirable to limit the integrator command when servo element 16 is saturated, but still permitting the proportional command.

Figure 2:
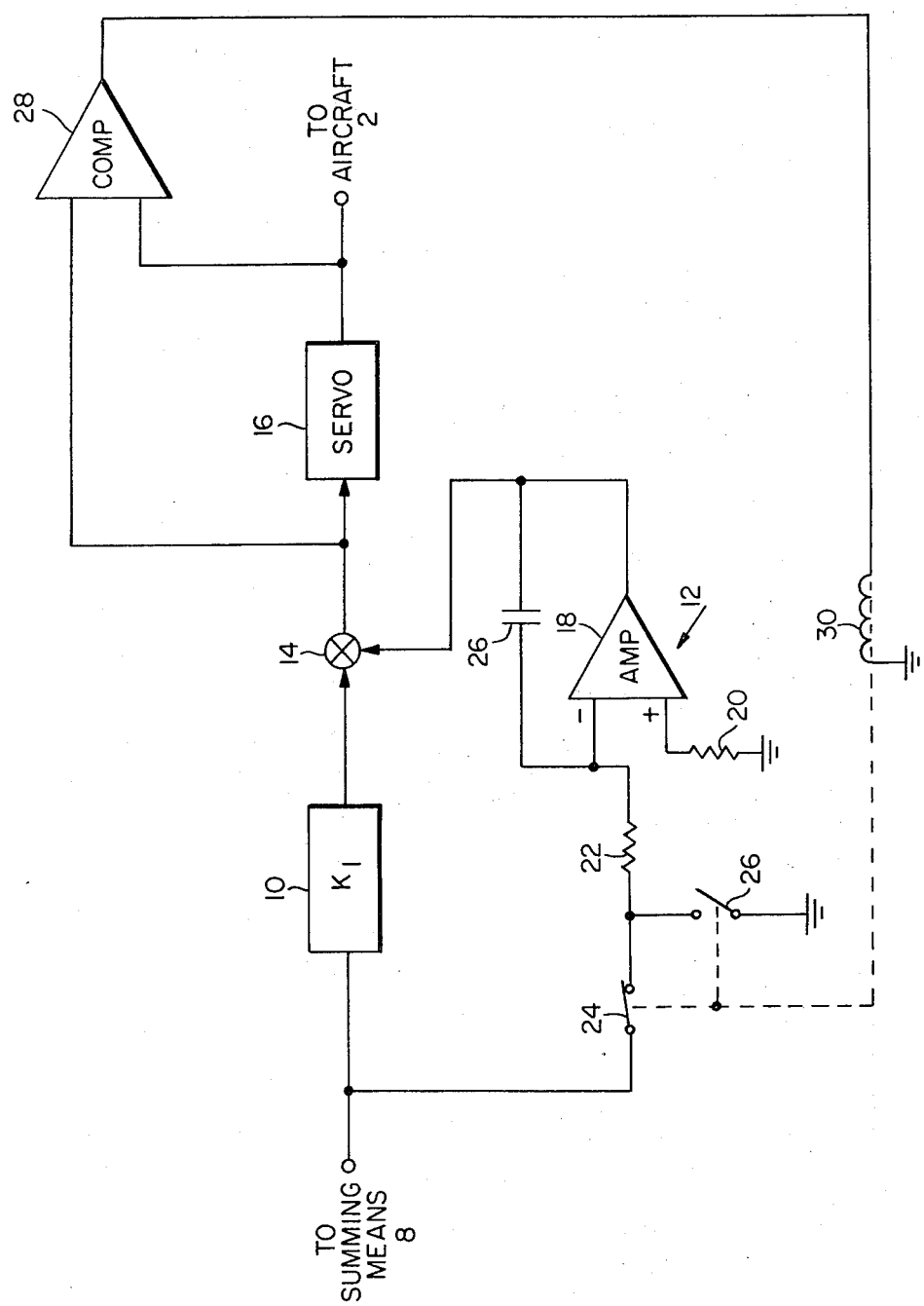
FIG. 2 is a combination block diagram-circuit diagram showing means for limiting the integrator command when the integrator is implemented with a separate operational amplifier arrangement shown in detail in the figure.

When integrator circuit 12 is implemented with a separate operational amplifier, switching means may be used for switching the integrator to a "hold" configuration as shown in FIG. 2.

Thus, integrator circuit 12 includes an amplifier 18 having a non-inverting input terminal grounded through a resistor 20 and an inverting input terminal connected through a resistor 22 and a normally closed switch 24 to summing means 8. A normally open grounded switch 26 is connected intermediate normally closed switch 24 and resistor 22. An integrating capacitor 26 is connected in feedback relation to the output and to the inverting input of amplifier 18.

Switching is effected as a function of servo saturation. The input to servo 16 (from summing means 14) and the output therefrom are applied to a comparator 28. Servo 16 may be of the follow-up type so that the input and output normally correspond. When the servo is saturated the input and output differ by a predetermined amount and comparator 28 provides a signal which actuates a relay 30. Relay 30, in turn, opens normally closed switch 24 and closes normally open switch 26. With switch 24 open and switch 26 closed, integrator circuit 12 is removed from the command path and the command is provided by proportional command circuit 10.

Figure 3:
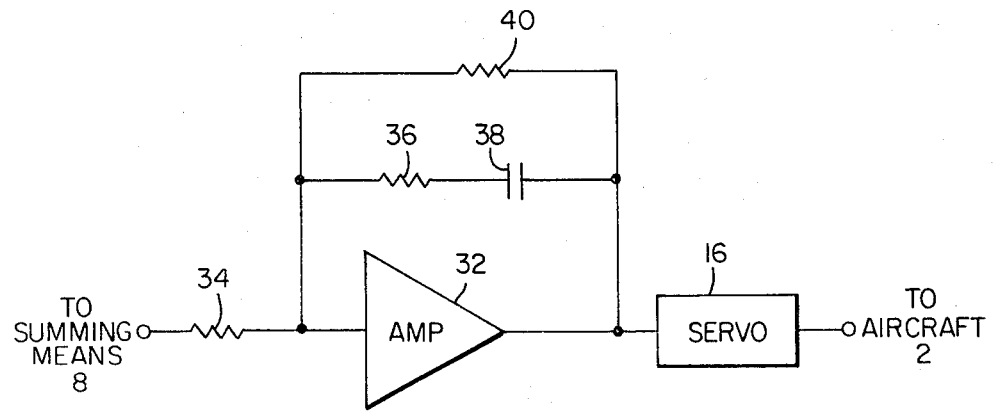
FIG. 3 is a combination diagram-circuit diagram showing one form of a combined integrator/proportional path command circuit and illustrating the problem solved by the present invention.

As may be the case, the integrator/proportional command functions may be achieved by more complex lag-lead circuitry such as shown in FIG. 3. This situation occurs when it is desired to use fewer operational amplifiers in the command circuitry.

Thus, FIG. 3 shows an operational amplifier 32 having an input connected through a resistor 34 to summing means 8 (FIG. 1) and an output connected to servo 16. A feedback path including a serially connected resistor 36 and capacitor 38 is connected to the input and output of amplifier 32 and a resistor 40 is connected in parallel with resistor 36 and capacitor 38.

In accordance with the foregoing discussion, when servo 16 is saturated it is desired to inhibit capacitor 38 from charging. Also, as aforenoted, switching of the capacitor out of the circuit is prohibited since at the switching time the capacitor is holding a voltage and the switching would cause an undesirable large output transient.

Figure 4:
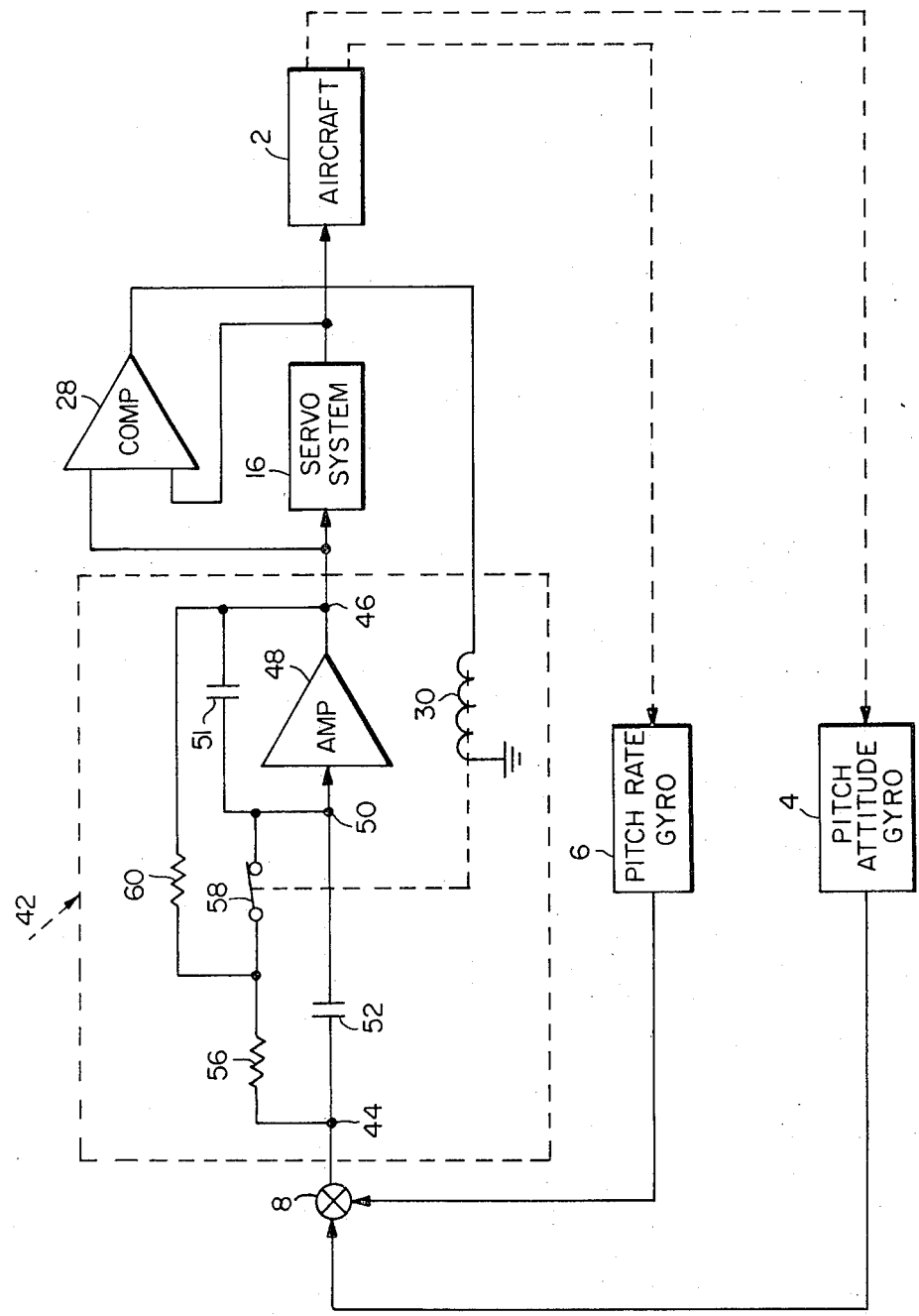
FIG. 4 is a combination block-diagram circuit diagram showing a control system including an integrator/proportional command circuit and switching means therefore, according to the invention.

This problem is alleviated by the device of the invention as shown in FIG. 4. Thus, the signals from pitch attitude gyro 4 and from pitch rate gyro 6 are summed by summing means 8 and an integrator/proportional command circuit 42 is connected at its input 44 to summing means 8 and at its output 46 to servo system 16.

Circuit 42 includes an amplifier 48 having an input 50. An integrator capacitor 51 is connected in feedback relation to circuit output 46 and to input 50 of amplifier 48, and input 50 is connected to circuit input 44 through a capacitor 52.

A resistor 56 and a serially connected normally closed switch 58 are connected to circuit input 44 and to amplifier input 50 in parallel with capacitor 52. A resistor 60 is connected intermediate resistor 56 and normally closed switch 58 and is connected to circuit output 46. Normally closed switch 58 is actuated by a relay 30 in response to the saturation of servo 16 through comparator 28 as noted with reference to FIG. 2, and which will be hereinafter more fully described with reference to FIG. 5.

When switch 58 is closed the desired lag-lead (command) characteristic is obtained by proper choice of resistor and capacitor values, upon saturation of servo system 16, the switch is opened. The output voltage at amplifier output 46 will not have a transient, but will hold its previous value just prior to switching and will follow changes of the input at input 44 in a proportional fashion.

Figure 5:
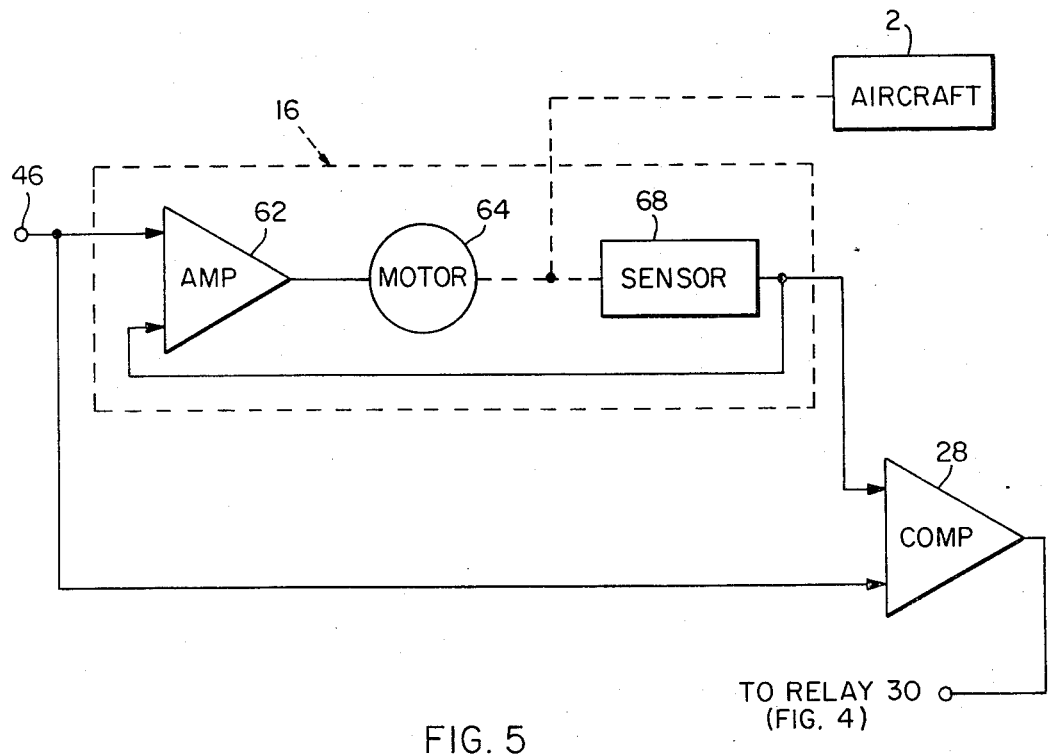
FIG. 5 is a block diagram showing means for implementing the switching means of FIG. 4.

As heretofore noted, comparator 28 is responsive to the saturation of servo system 16 to actuate relay 30 which in turn opens switch 58. An arrangement for achieving this purpose is shown in FIG. 5.

Thus, servo system 16 is shown for purposes of describing the switching function as including a servo amplifier 62 connected to command circuit output 46 and a servo motor 64 driven by servo amplifier 62. The servo motor is suitably coupled to aircraft 2 for driving the aircraft elevators as heretofore noted. Servo system 16 may further include a sensor 68 coupled to motor 64 for sensing motor shaft displacement and for providing a corresponding signal. Comparator 28 compares this signal to the servo system input signal at 46 and provides a difference signal when the servo system is saturated (i.e. the motor shaft no longer follows the input) and which difference signal actuates relay 30.

It will be seen that other means for operating relay 30 may be used equally as well. For example, limit switches may be connected to servo motor 64 for switching a voltage into the circuit for operating relay 30 when the servo system is at saturation as will now be understood.

From the aforenoted description of the invention it will be seen that the objects hereunto set forth have been met. The integrator command is limited when the control (servo) element is saturated, while still allowing the proportional command. Capacitor switching, which may result in an undesirable output transient, is obviated and the desired transfer function i.e. integrator to proportional control and memory retention, is obtained by switching resistors only.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the part.

What is claimed is:

1. In a control system of the type including means for sensing a condition and for providing a corresponding signal, means responsive to the condition signal for providing a command signal and control means responsive to the command signal for controlling the condition, the improvement comprising:

the command signal means including circuit means and integrating means connected thereto through a normally closed switch for providing the command signal as the integral of the condition signal, and means responsive to saturation of the saturable control element for opening the normally closed switch so that the command signal proportionately follows the condition signal.

2. A control system as described by claim 1, wherein the circuit means includes:

a capacitor connected between the condition signal means and the integrating means;

a first resistor connected between the capacitor and the condition signal means;

the normally closed switch connecting the first resistor to the integrating means; and a second resistor connected between the first resistor and the normally closed switch and connected to the integrating means.

3. A system as described by claim 2, wherein:

the capacitor is connected to the integrating means input; and the second resistor is connected to the integrating means output.

4. A control system, comprising:

means for providing a signal as a function of a condition;

means for providing a command signal including integrating means connected to the condition signal means and circuit means connected to the condition signal means through a normally closed switch, said integrating means providing the command signal as the integral of the condition signal when the switch is closed;

saturable control means connected to the command signal means for controlling the condition in response to the command signal;

means connected to the saturable control means and to the normally closed switch for opening switch when the control means is saturated; and the circuit means being affective when the switch is opened to provide the command signal in proportion to the condition signal.

5. A system as described by claim 4, wherein the circuit means includes:

a capacitor connected between the condition signal means and the integrating means;

a first resistor connected between the condition signal means and the capacitor, and the switch serially connected to the first resistor and connected to the integrating means; and a second resistor connected between the first resistor and the switch and connected to the integrating means.

6. A system as described by claim 4, wherein the means for providing a signal as a function of a condition includes:

means for providing a signal corresponding to the condition;

means for providing a signal corresponding to the rate of change of the condition; and means for summing said signals.

7. A control system as described by claim 4, wherein the means connected to the saturable control means and to the normally closed switch for opening said switch when the control element is saturated includes:

means for providing a signal corresponding to the output of the control means;

means for comparing the signal corresponding to the output of the control means and the command signal, and providing a difference signal when the control means is saturated; and means connected to the comparing means and to the normally closed switch for opening said switch in response to the difference signal.

* * * * *